United States Patent [19]
Wallis

[11] 3,746,184
[45] July 17, 1973

[54] SAFETY RETRACT MECHANISM

[76] Inventor: Bernard J. Wallis, 25200 Trowbridge Avenue, Dearborn, Mich.

[22] Filed: July 26, 1971

[21] Appl. No.: 166,280

Related U.S. Application Data

[63] Continuation-in-part of Ser. No. 67,843, Aug. 28, 1970, abandoned.

[52] U.S. Cl. .............................. 214/1 BB, 198/218
[51] Int. Cl. ........................................... B65g 25/04
[58] Field of Search ................... 214/1 BB; 198/218

[56] References Cited
UNITED STATES PATENTS 3,655,070   4/1972   Haydu ............................. 214/1 BB
3,411,636   11/1968  Wallis .............................. 214/1 BB Primary Examiner—Gerald M. Forlenza
Assistant Examiner—George F. Abraham
Attorney—Barnes, Kisselle, Raisch & Choate

[57] ABSTRACT

A safety retract mechanism for a transfer device which indexes workpieces between successive stations in a press-mounted die. The safety retract is actuated by the press ram to remove the work-gripping elements of the transfer device from the die should the usual drive arrangement for these elements be rendered inoperative.

19 Claims, 15 Drawing Figures

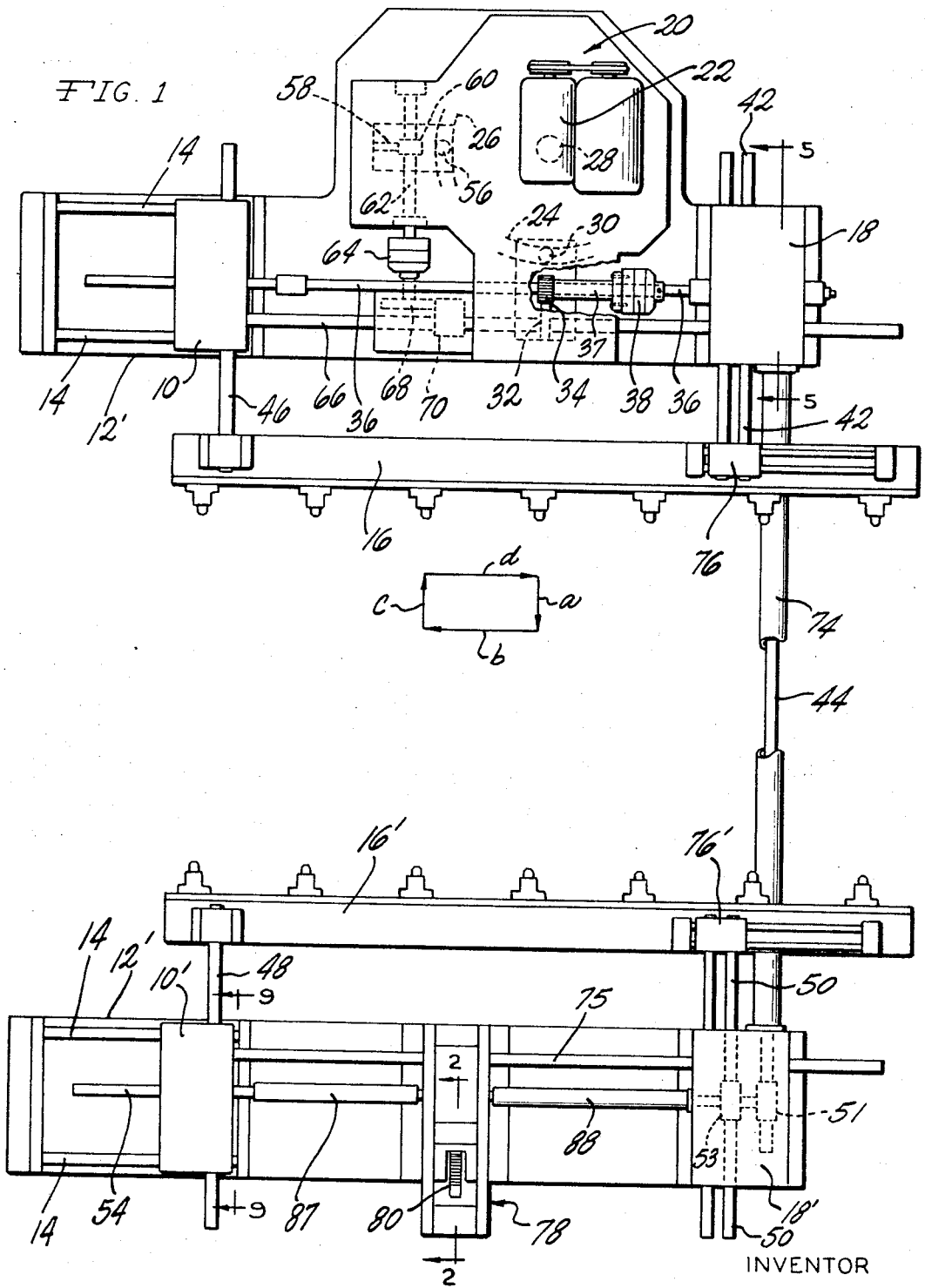

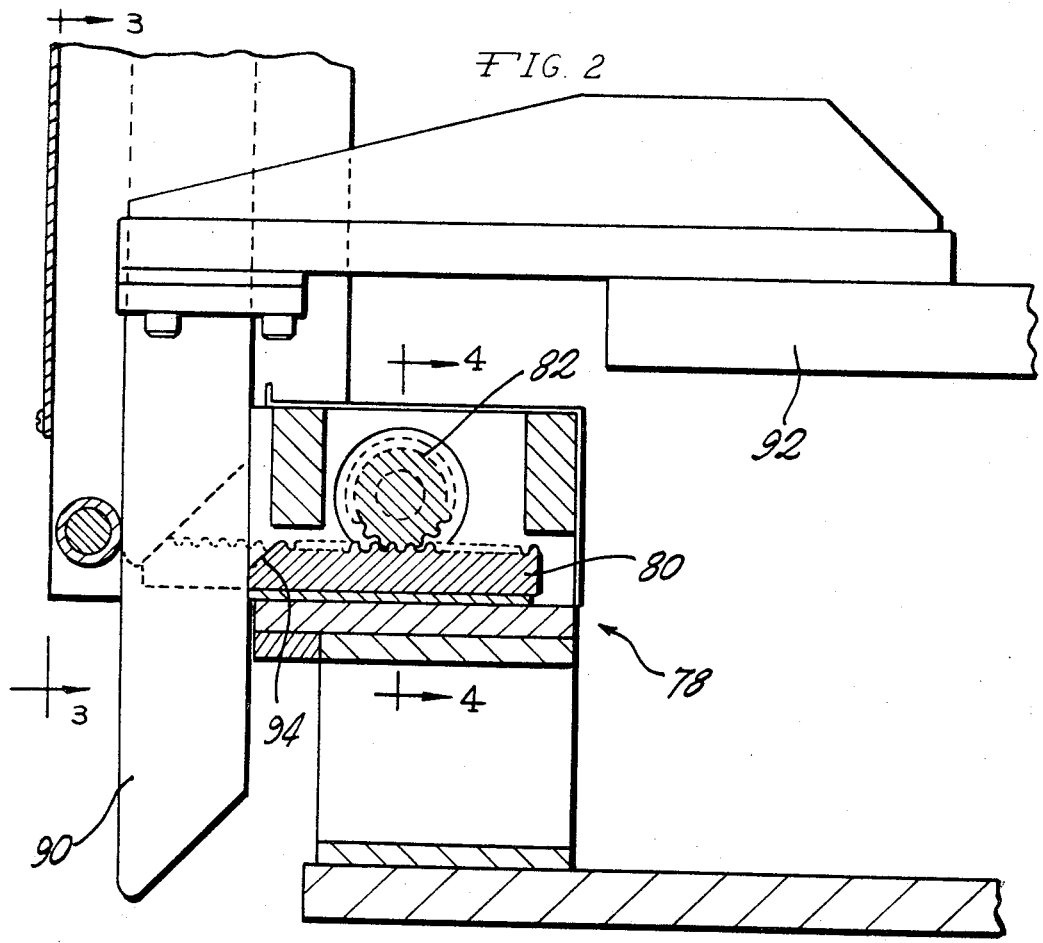
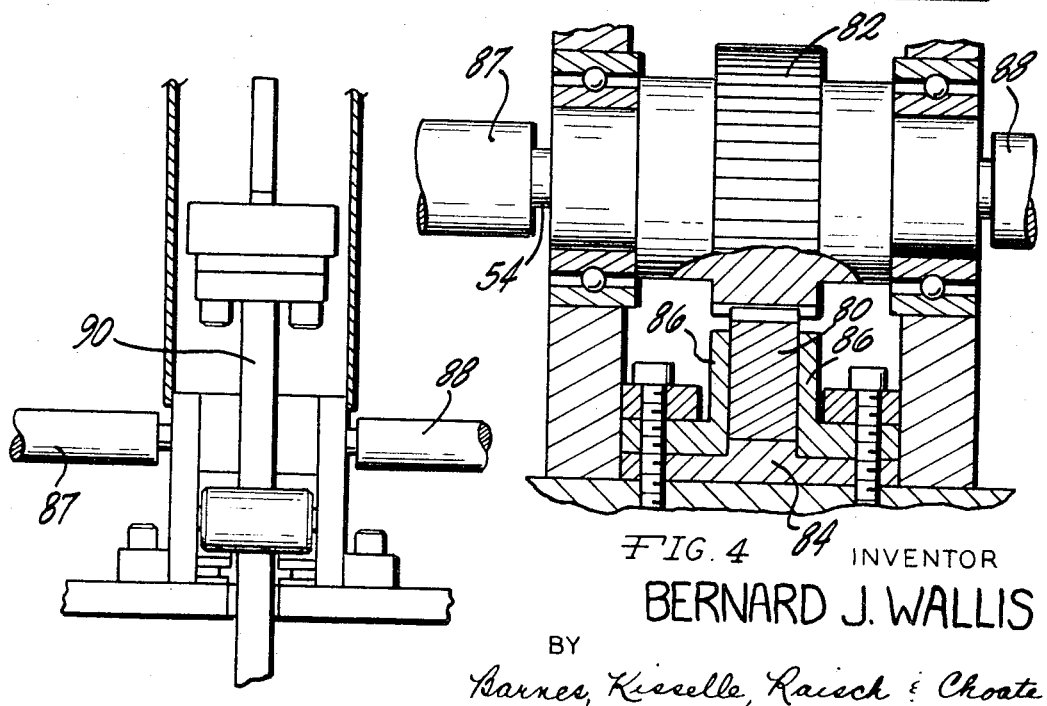

INVENTOR
BERNARD J. WALLIS
BY
Barnes, Kisselle, Rausch & Choate
ATTORNEYS

INVENTOR
BERNARD J. WALLIS
BY
*Barnes, Kisselle, Raisch & Choate*
ATTORNEYS

Patented July 17, 1973

INVENTOR
BERNARD J. WALLIS

BY Barnes, Kisselle, Raisch & Choate
ATTORNEYS

Patented July 17, 1973

INVENTOR
BERNARD J. WALLIS
BY
Barnes, Kisselle, Raisch & Choate
ATTORNEYS

SAFETY RETRACT MECHANISM

This application is a continuation-in-part of my prior co-pending application Ser. No. 67,843, filed Aug. 28, 1970 and now abandoned.

The present invention relates to a work transfer device for indexing workpieces between successive stations in a die mounted in a press. More specifically, the invention is concerned with a safety retract mechanism for positively removing the workpiece-engaging elements of the transfer device from between the closing dies should the usual means for retracting these elements be rendered inoperative.

In my prior U.S. Pat. No. 3,411,636, issued Nov. 19, 1968, there is disclosed a safety retract mechanism for a transfer device. An objection to the operation of that mechanism is that the workpiece-engaging elements, also referred to as finger bars, cannot be retracted from the extended position so long as the carriage is in its forward transfer stroke. Thus, should the carriage jam before the completion of the transfer stroke the safety retract mechanism will be incapable of retracting the finger bars.

In a transfer device in which the drive for the finger bars is independent of the drive for the carriage, the finger bars can remain extended between the upper and lower dies should power to the finger bar drive be lost or should the finger bars become disconnected from the drive by the operation of an overload protection device. While an electrical interlock for turning off the press should the finger bars remain in the extended position is often provided, the response of the ram to the loss of drive signal may be relatively slow. Thus, should the signal occur with the finger bars extended and the ram moving downward, the inertia of the ram may be sufficient to close the dies upon the finger bars thereby damaging both the dies and the transfer device. This situation is especially critical when the press ram has a short stroke.

It is an object of the present invention to provide a transfer device having a safety retract mechanism which is actuated by the downward movement of the press ram for positively retracting the finger bars of the transfer device from between the closing dies should the usual drive arrangement for the finger bars be rendered inoperative either by an overload condition in the transfer device or by a loss of power to the drive by reason of a malfunction or other cause.

It is another object of this invention to provide a safety retract mechanism for the finger bars which operates independently of the position of the carriage.

It is a further object of this invention to provide a safety retract mechanism which is integrated with existing components of the transfer device so as to be of minimal cost.

In the drawings:

FIG. 1 is a plan view of a transfer device having a safety retract mechanism of the present invention.

FIG. 2 is a sectional view taken along line 2—2 in FIG. 1.

FIG. 3 is a sectional view taken along line 3—3 in FIG. 2.

FIG. 4 is a sectional view taken along line 4—4 in FIG. 2.

Figure 6:
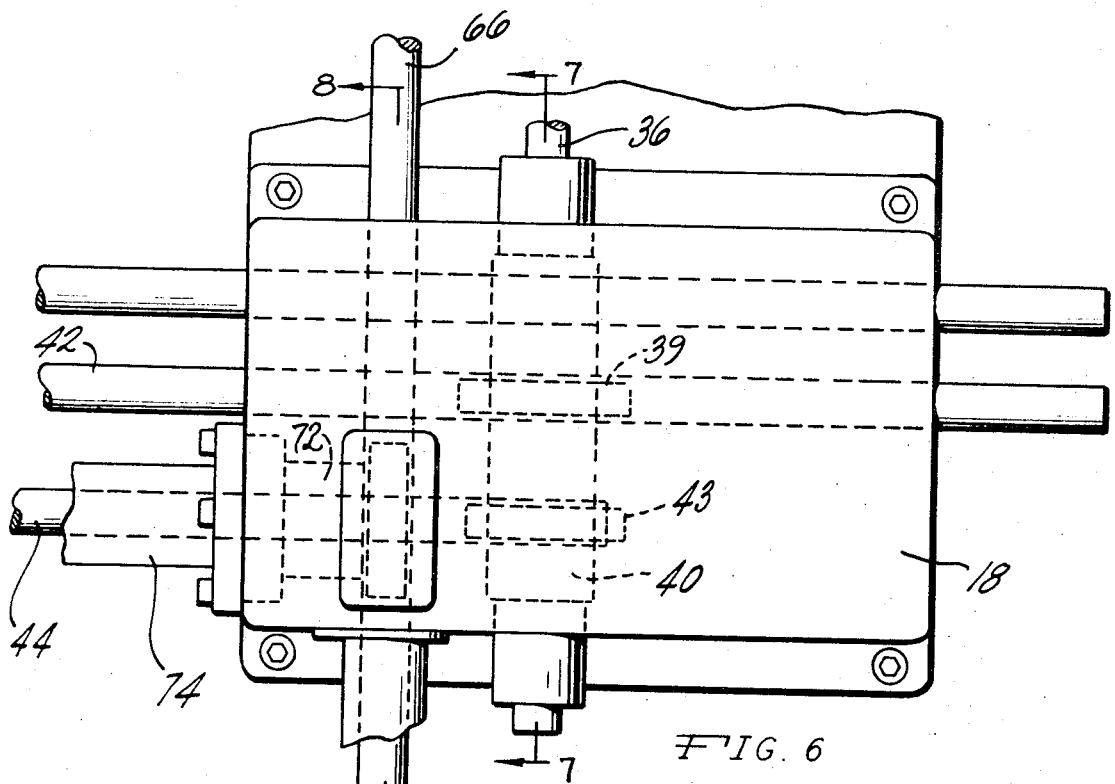
FIG. 6 is a plan view of the arrangement shown in FIG. 5.

Referring to FIG. 1, carriages 10, 10' are slidably mounted for rectilinear motion on bases 12,12' by means of guides 14. Finger bars 16, 16' are slidably supported on carriages 10, 10' as well as on housings 18, 18' for movement transverse to the direction of carriage travel.

The operating motion of finger bar 16 is described with reference to the indicated arrows, $a$, $b$, $c$, $d$, it being understood that the motion of finger bar 16' is symmetrically opposite. The cycle begins with finger bar 16 being shifted in the direction of arrow $a$ from the retracted position to the extended position to thereby engage workpieces (not shown). Finger bar 16 carrying the workpieces in cooperation with finger bar 16' is then transferred forward along arrow $b$ by shifting carriage 10. Having transferred the workpieces, finger bar 16 is now retracted along arrow $c$, and is finally returned along the direction of arrow $d$ to its initial position by the return of carriage 10.

The drive mechanism for carriages 10, 10' and finger bars 16, 16', generally indicated at 20, comprises a motor and gear assembly 22 adapted to rotate cam tracks 24, 26 about a pivot shaft 28. Cam track 24 controls the transverse movement of finger bars 16, 16', while cam track 26 controls the movement of carriages 10, 10'.

Figure 7:
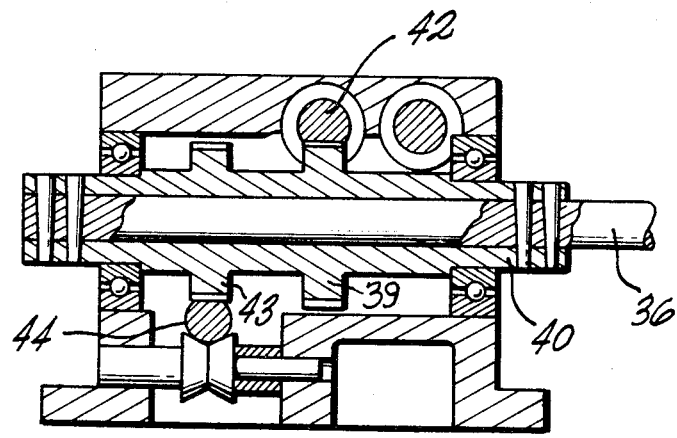
FIG. 7 is a sectional view taken along line 7—7 in FIG. 6.

The finger bar motion is derived from a follower 30 trapped in track 24 so as to reciprocate a gear rack 32. Rack 32 engages a pinion 34 which is journalled on a shaft 36 and coupled to a sleeve 37 which forms the input portion of an overload protection device 38. Overload protection device 38 is similar to that described in my co-pending application Ser. No. 12,271, filed Feb. 18, 1970 (now U.S. Pat. No. 3,599,067, issuing Aug. 10, 1971). The output portion of device 38 includes shaft 36 which extends between carriage 10 and housing 18 through sleeve 37. In the event of an overload shaft 36 is uncoupled from sleeve 37. Shaft 36 drives a pinion shaft 40 supported within housing 18 as is clearly shown in FIGS. 6 and 7. Pinion shaft 40 has a pinion 39 thereon (FIG. 6) which meshes with rack 42. Suitable gearing in carriage 10 connects shaft 36 with rack 46. When shaft 36 is rotated in opposite directions finger bar 16, which is supported by the ends of racks 42, 46, is extended and retracted.

Pinion shaft 40 carries a second pinion 43 which meshes with a rack 44 extending transversely between housings 18, 18'. Rack 44 provides a drive to finger bar 16' which is supported on the ends of racks 48, 50. Within housing 18', rack 44 meshes with a pinion 51 on one end of a shaft 54. Shaft 54 extends from housing 18' through carriage 10'. A second pinion 53 on shaft 54 drives rack 50 through a gear arrangement whereby finger bars 16, 16' are extended and retracted in unison. The connection between shaft 54 and rack 48 is illustrated in FIGS. 9 through 12. The portion of shaft 54 extending through carriage 10' is square and is arranged to slide through a pinion 52 journalled in carriage 10'. Pinion 52 meshes with rack 48. Thus, when rack 44 is reciprocated finger bar 16' is extended and retracted.

Figure 5:
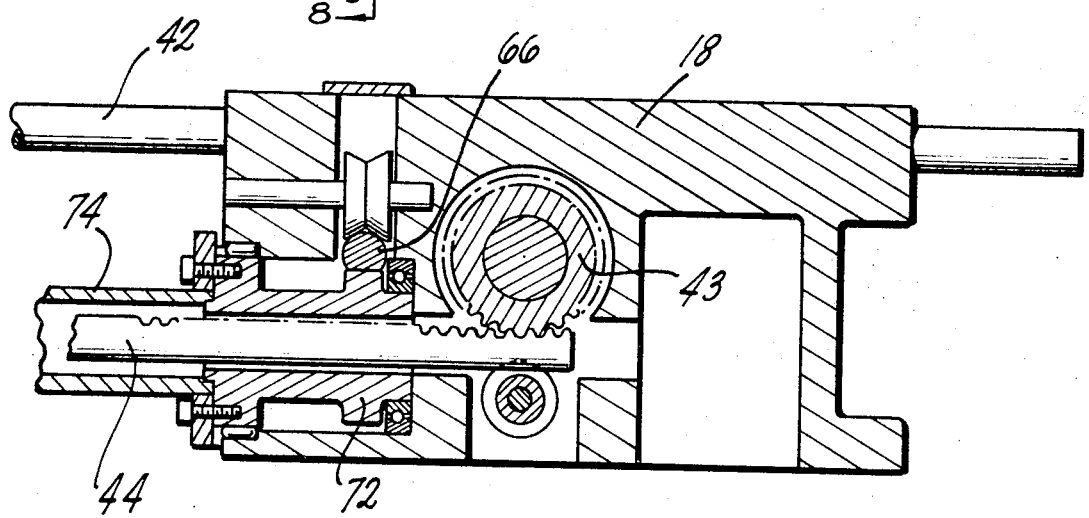
FIG. 5 is a sectional view taken along line 5—5 in FIG. 1.
Figure 8:
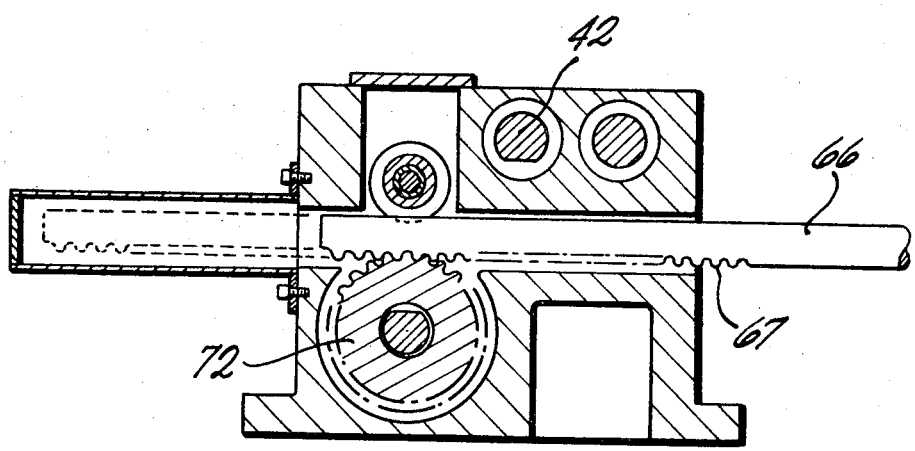
FIG. 8 is a sectional view taken along line 8—8 in FIG. 6.
Figure 10:
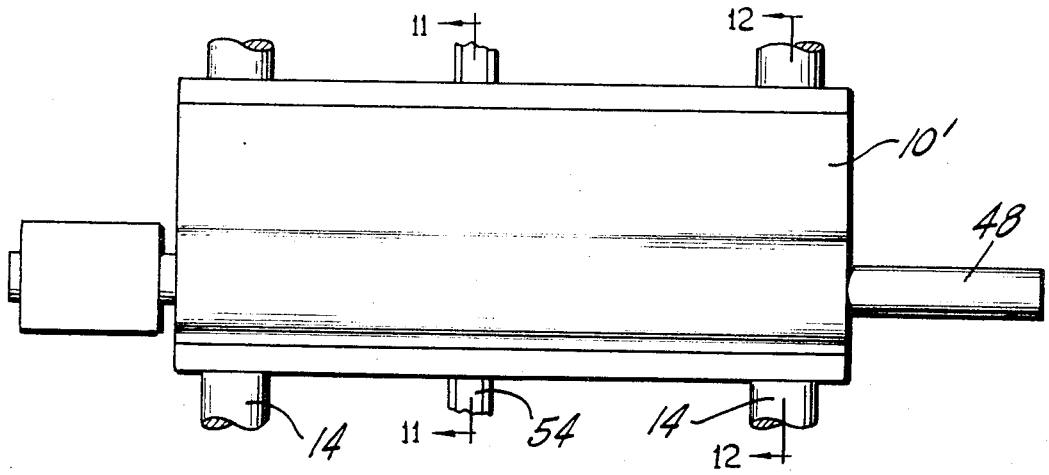
FIG. 10 is a plan view of the arrangement shown in FIG. 9.
Figure 9:
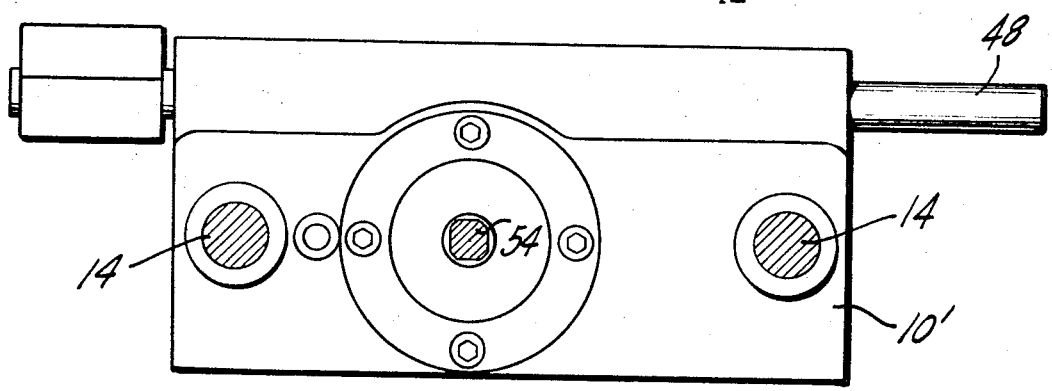
FIG. 9 is a sectional view taken along line 9—9 in FIG. 1.
Figure 11:
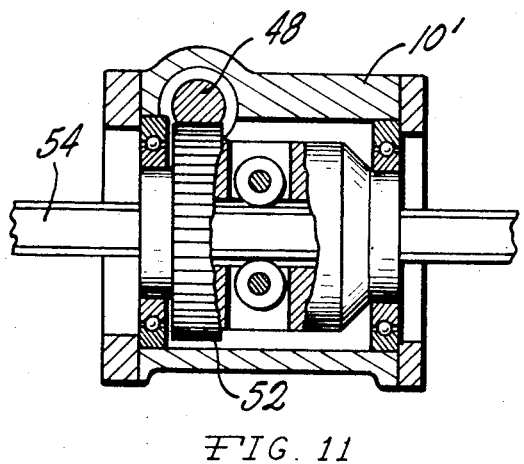
FIG. 11 is a sectional view taken along line 11—11 in FIG. 10.
Figure 12:
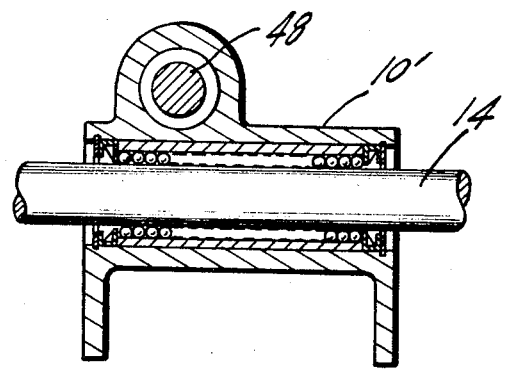
FIG. 12 is a sectional view taken along line 12—12 in FIG. 10.

The carriage motion is derived from a follower 56 trapped in track 26 and adapted to reciprocate a gear rack 58. Rack 58 in turn engages pinion 60 for rotating shaft 62. Shaft 62 is coupled to the input portion of an overload device 64 which operates similarly to overload device 38. The output portion of overload device 64 is adapted to reciprocate a rod 66 through gears 68, 70. Rod 66 is connected directly to carriage 10 and has a second rack portion 67 within housing 18 for driving a pinion sleeve 72 supported within housing 18, as is clearly shown in FIGS. 5 and 8. Pinion sleeve 72 is coupled to a coupling shaft 74 which surrounds rack 44. Within housing 18' shaft 74 is connected by a pinion (not shown) with a rack 75 connected directly to carriage 10'. Thus when shaft 62 is rotated carriages 10, 10' are shifted in unison. As carriage 10 and carriage 10' are shifted, finger bars 16, 16' are slidably guided through guide blocks 76, 76' which are supported from housings 18, 18'.

The safety retract mechanism of the present invention is shown generally at 78 in FIG. 1. The mechanism comprises a rack 80 which meshes with a pinion 82 and is slidable in a direction perpendicular to the direction of carriage travel as is clearly shown in FIGS. 2 and 4. Rack 80 is guided for movement on a base 84 by gibs 86 and has a chamfered end portion 94 which is adapted to be engaged by a cam 90 on the press ram 92. Pinion 82 is coupled for rotation with sleeves 87, 88, which couple together the segments of finger bar actuating shaft 54.

Under normal operating conditions the finger bar actuating mechanism causes pinion 82 to be rotated in a counter-clockwise direction in FIG. 2 as finger bars 16, 16' are shifted from the extended position to the retracted position. This causes rack 80 to be shifted out of the way of cam 90 which moves downward with ram 92. However, should there be a malfunction and the finger bars fail to be retracted from the path of the oncoming ram, rack 80 remains disposed in the path of cam 90. As the ram continues downward cam 90 engages rack 80 as shown by the broken lines in FIG. 2. As the ram completes its downward stroke, the action of cam 90 with the chamfered portion 94 of rack 80 shifts rack 80 out of the path of the cam. As rack 80 is shifted, it rotates pinion 82 to thereby retract finger bars 16, 16'. Thus, the finger bars are positively removed from between the closing dies so as to prevent any damage thereto regardless of the position of carriages 10, 10'.

Figure 13:
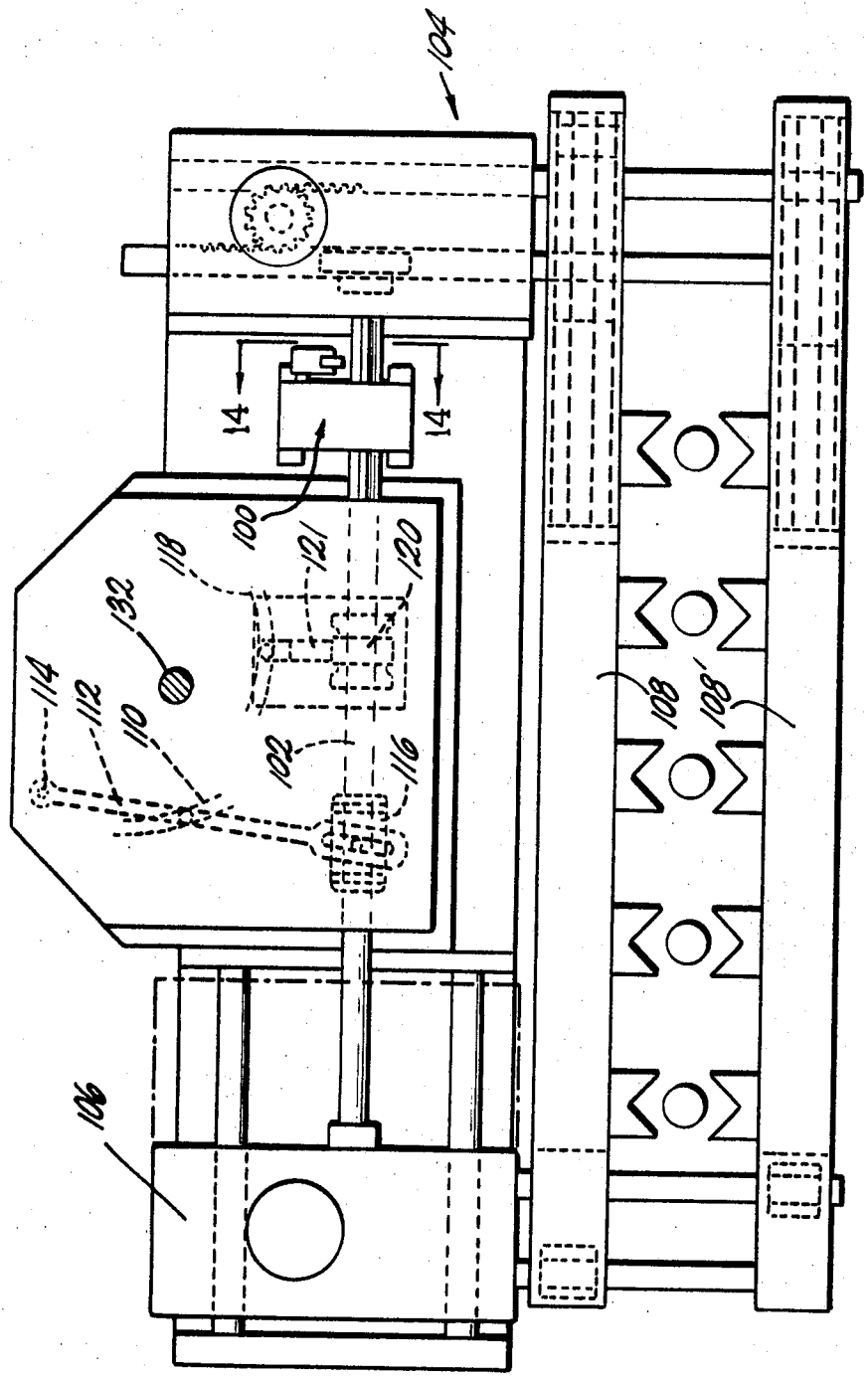
FIG. 13 is a plan view of a transfer device embodying an alternative form of the safety retract mechanism of the present invention.

An alternative form of the safety retract mechanism is shown generally at 100 in FIG. 13. The drive shaft 102 of the transfer device 104 is adapted to drive the carriage 106 as well as to actuate the finger bars 108, 108'. The carriage motion is derived from a cam track 110 which actuates a lever 112 for pivotal movement about shaft 114. The opposite end of lever 112 is adapted to shift drive shaft 102 for transferring carriage 106 by means of a collar 116 axially fixed to shaft 102 and in which shaft 102 is free to rotate. The finger bar motion is derived from a cam track 118 which rotates shaft 102 by means of a gear 120 and a rack 121. Shaft 102 is free to slide through gear 120 during carriage transfer but is keyed to gear 120 for rotation therewith.

Safety retract mechanism 100 is fixably mounted on transfer device 104, and comprises a pinion 122 which is adapted to be rotated by shaft 102 (FIGS. 14 and 15), and through which shaft 102 is free to slide during carriage transfer. Pinion 122 meshes with a second pinion 124 to which is attached a crank 126. A roller 128 at the end of crank 126 is adapted to be engaged by an actuator 130 attached to the press ram.

Under normal operation, as the finger bars are shifted by the rotation of shaft 102 pinion 122 is also rotated. This causes crank 126 to be pivoted out of the path of actuator 130 as the ram completes it downstroke. In the event of a malfunction causing the finger bars to remain extended with the ram moving downward, actuator 130 engages crank 126 as shown by the broken lines in FIG. 14. As the ram continues downward crank 126 is pivoted by actuator 130 so as to rotate shaft 102 through pinions 122, 124 and thereby positively remove the finger bars from between the closing dies.

In the arrangement shown in FIG. 13 a safety overload disconnect mechanism would be connected between shaft 132 which drives the cam on which cam tracks 110, 118 are formed and the mechanism for driving shaft 132 to disconnect the drive to the carriage in the event that it jams in the course of its longitudinal stroke. An additional safety overload disconnect mechanism would also be located in the rotary drive between the cam and shaft 102 to permit the cam to continue to rotate in the event the finger bars 108, 108' jam in the course of their transverse movement.

It will be noted with respect to both embodiments illustrated that the drive for the finger bars operates independently of the drive to the carriages, and thus, even if the carriages should jam at any point in their stroke, the safety retract mechanisms are adapted to retract the finger bars.

Figure 14:
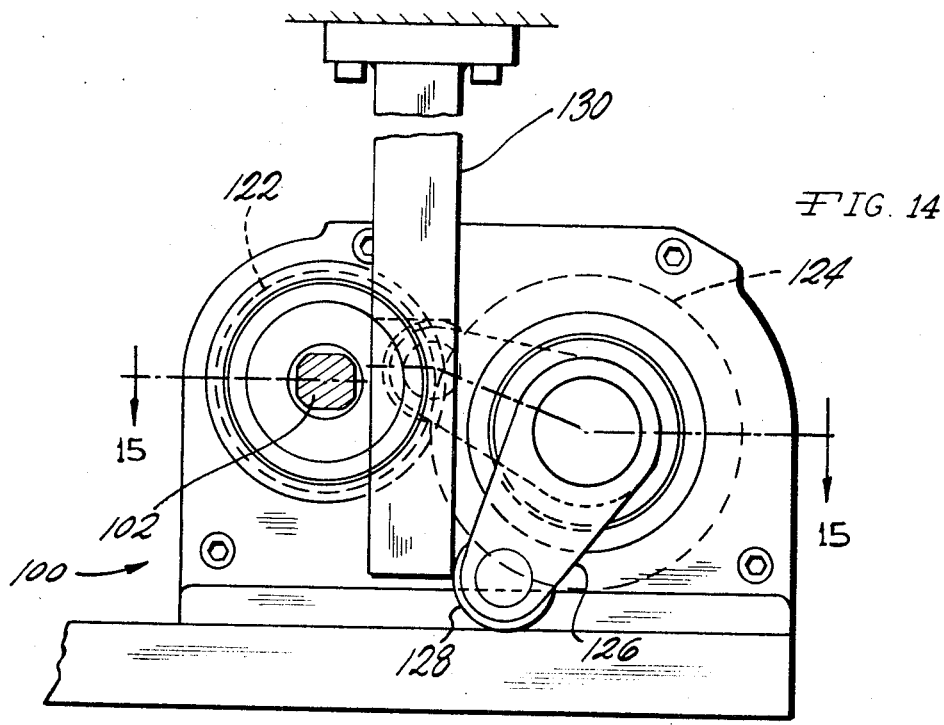
FIG. 14 is a sectional view taken along line 14—14 in FIG. 13.
Figure 15:
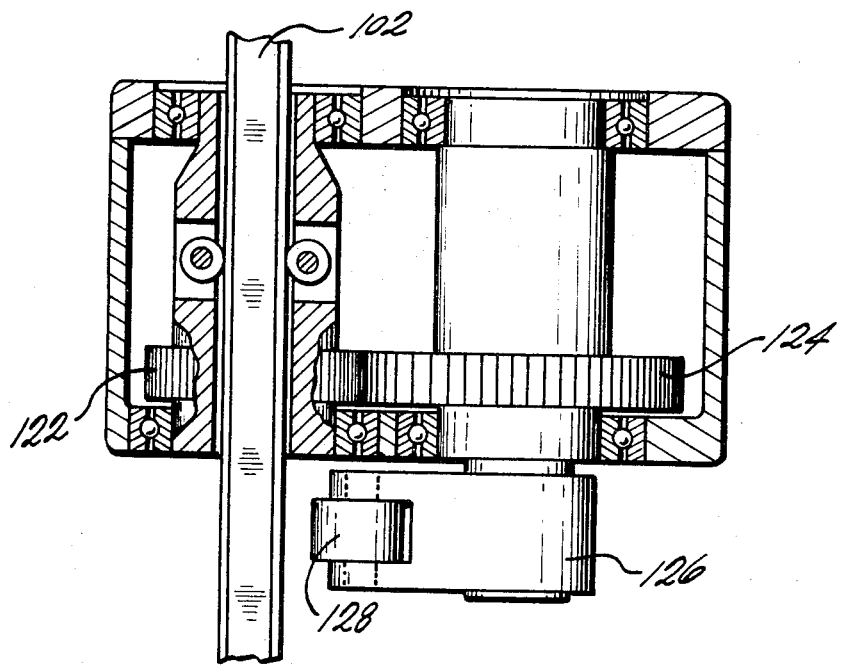
FIG. 15 is a sectional view taken along line 15—15 in FIG. 14.

It will also be appreciated that the gear and rack arrangement shown in FIG. 2 and the gear and crank arrangement shown in FIG. 14 are merely optional devices for rotation the finger bar actuating shaft and are, thus, interchangeable regardless of whether the finger bar actuating shaft merely rotates or rotates and shafts axially.

I claim:

1. In a transfer device for use with a press having a vertically reciprocating ram on which an upper die is adapted to be mounted for cooperation with a lower die, said device being of the type for transferring a workpiece between stations in the die and having a carriage shiftable rectilinearly between a return position and a forward position and on which is slidably supported a finger bar shiftable between an extended, workpiece-engaging position and a retracted position in a direction generally transverse to the direction of travel of the carriage, the combination comprising first drive means, means operatively connecting said first drive means with said carriage for shifting the carriage, means operable independently of said last-mentioned means operatively connecting said first drive means with said finger bar for shifting the finger bar, control means for shifting the carriage and the finger bar in a predetermined sequence, a safety retract mechanism comprising a second drive means, means including a rotatable shaft operatively connecting the second drive means with the finger bar for shifting the finger bar, and means responsive to the downward movement of said press ram with the finger bar in the extended position for rotating said rotatable shaft to shift the finger bar to the retracted position independent of the position of the carriage.

2. The combination called for in claim 1 wherein said means for rotating said rotatable shaft is movable with the press ram.

3. The combination called for in claim 1 wherein said operative connection between said first drive means and said carriage comprises a shaft which is axially movable and fixedly connected to the carriage, said rotatable shaft being common to said two operative connections between the finger bar and the first and second drive means, said rotatable shaft being rotatable independently of axial movement of said axially movable shaft to shift said finger bar.

4. The combination called for in claim 3 including means for disconnecting said common shaft from the first drive means in the event the torque on said shaft exceeds a predetermined value.

5. The combination called for in claim 2 wherein said second drive means includes a movable member operably connected to said rotatable shaft and lying in the path of travel of the means for rotating said shaft when the finger bar is in the extended position, said actuating means being adapted to engage and move said movable member to retract the finger bar when the press ram descends to a predetermined position with the finger bar in the extended position.

6. The combination called for in claim 5 wherein said movable member comprises a crank.

7. The combination called for in claim 6 wherein said operative connection between said first mentioned drive means and said carriage comprises a shaft which is axially movable and fixedly connected to the carriage, said two operative connections between the finger bar and the first and second drive means including said rotatable shaft, said rotatable shaft being rotatable independently of axial movement of said axially movable shaft to shift said finger bar, said crank being operatively connected with said shaft.

8. The combination called for in claim 5 wherein said movable member comprises a gear rack.

9. The combination called for in claim 8 wherein said actuating means includes cam means adapted to move said gear rack.

10. The combination called for in claim 8 wherein said operative connection between said first mentioned drive means and said carriage comprises a shaft which is axially movable and fixedly connected to the carriage, said two operative connections between the finger bar and the first and second drive means including said rotatable shaft, said rotatable shaft being rotatable independently of axial movement of said axially movable shaft to shift said finger bar, and said gear rack being operatively connected with said shaft.

11. In a transfer device for use with a press having a vertically reciprocating ram on which an upper die is adapted to be mounted for cooperation with a lower die, said device being of the type for transferring a workpiece between stations in the die and having a carriage shiftable rectilinearly between a return position and a forward position and on which is supported a finger bar shiftable in a direction generally transverse to the direction of travel of the carriage between an extended workpiece-engaging position and a retracted position, the combination comprising, first drive means for the transfer device, means forming a first drive train operatively connecting said first drive means with said carriage for shifting the carriage, means forming a second drive train operatively connecting said drive means with said finger bar for shifting the finger bar, means in and individual to said last-mentioned drive train forming an overload disconnect therein for operatively disconnecting said finger bar from said drive means when the driving force to which the second drive train is subjected exceeds a predetermined value, a rotatable shaft which when actuated is adapted to shift the finger bar independently of the overload disconnect means, a safety retract mechanism for the finger bar comprising a second drive means, means operatively connecting the second drive means with said rotatable shaft for shifting the finger bar, and means timed with the downward movement of said press ram for actuating said last-mentioned drive means to actuate said rotatable shaft and shift the finger bar to the retracted position in the event the first drive means is ineffective to retract the finger bar.

12. The combination called for in claim 11 wherein said rotatable shaft comprises an element of the second drive train located therein between the overload disconnect means and the finger bar.

13. The combination called for in claim 11 wherein the means for actuating the second drive means are adapted to reciprocate with the press ram and to actuate the second drive means upon downward movement of the press ram.

14. The combination called for in claim 11 wherein said rotatable shaft forms an element of the second drive train.

15. The combination called for in claim 11 wherein the actuating means for the second drive means are mounted to move the press ram, the second drive means including a movable member which lies in the path of travel of the actuating means when the finger bar is in the extended or partly extended position, said actuating means being adapted to engage and move said movable member to retract the finger bar when the press ram descends to a predetermined position and the finger bar is in the extended or partly extended position.

16. The combination called for in claim 15 wherein the movable member comprises a crank.

17. The combination called for in claim 15 wherein the movable member comprises a gear rack.

18. The combination called for in claim 17 wherein the actuating means includes a cam for moving said gear rack.

19. In a transfer device for use with a press having a vertically reciprocating ram on which an upper die is adapted to be mounted for cooperation with a lower die, said device being of the type for transferring a workpiece between a series of successive stations in the die and having work-engaging fingers thereon shiftable between successive stations in forward and return strokes for advancing the workpieces to successive stations and shiftable in a direction transversely of said stations between an extended work-engaging position and a retracted position, said device including a finger bar member and a carriage member, said work-engaging fingers being mounted on the finger bar member and said finger bar member being mounted on the carriage member, means for guiding one of said members in a path parallel to the series of stations to shift the work-engaging fingers in said forward and return strokes, means for guiding the other member in a path transversely of said series of stations for shifting the work-engaging fingers to said work-engaging position and said retracted position whereby, when said members are shifted in a predetermined sequence in their respective paths of travel, the work-engaging fingers are first caused to shift into work-engaging position, then moved forwardly in the advance stroke to advance the engaged workpieces to the next successive stations, then retracted to disengage the workpieces and finally moved in the return stroke to return the work-engaging fingers to the starting position, the combination comprising, first drive means for the transfer device, means forming a first drive train operatively connecting said first drive means with said one member for shifting the work-engaging fingers between successive stations, means forming a second drive train operatively connecting said first drive means with said other member for shifting the work-engaging fingers between work-engaging and retracted positions, means in and individual to said last-mentioned drive train forming an overload disconnect therein for operatively disconnecting said other member for shifting the work-engaging fingers to and from work-engaging position from the first drive means when the driving force to which the second drive train is subjected exceeds a predetermined value, a rotatable shaft which when actuated is adapted to shift the work-engaging fingers to the retracted position independently of the condition of the overload disconnect means, a safety retract mechanism for the work-engaging fingers comprising, a second drive means, means operatively connecting the second drive means with said rotatable shaft and means timed with the downward movement of the press ram for actuating the lastmentioned drive means to in turn actuate said rotatable shaft and shift the work-engaging fingers to the retracted position in the event the first drive means is ineffective to retract the work-engaging fingers.

* * * * *